Figure 1:
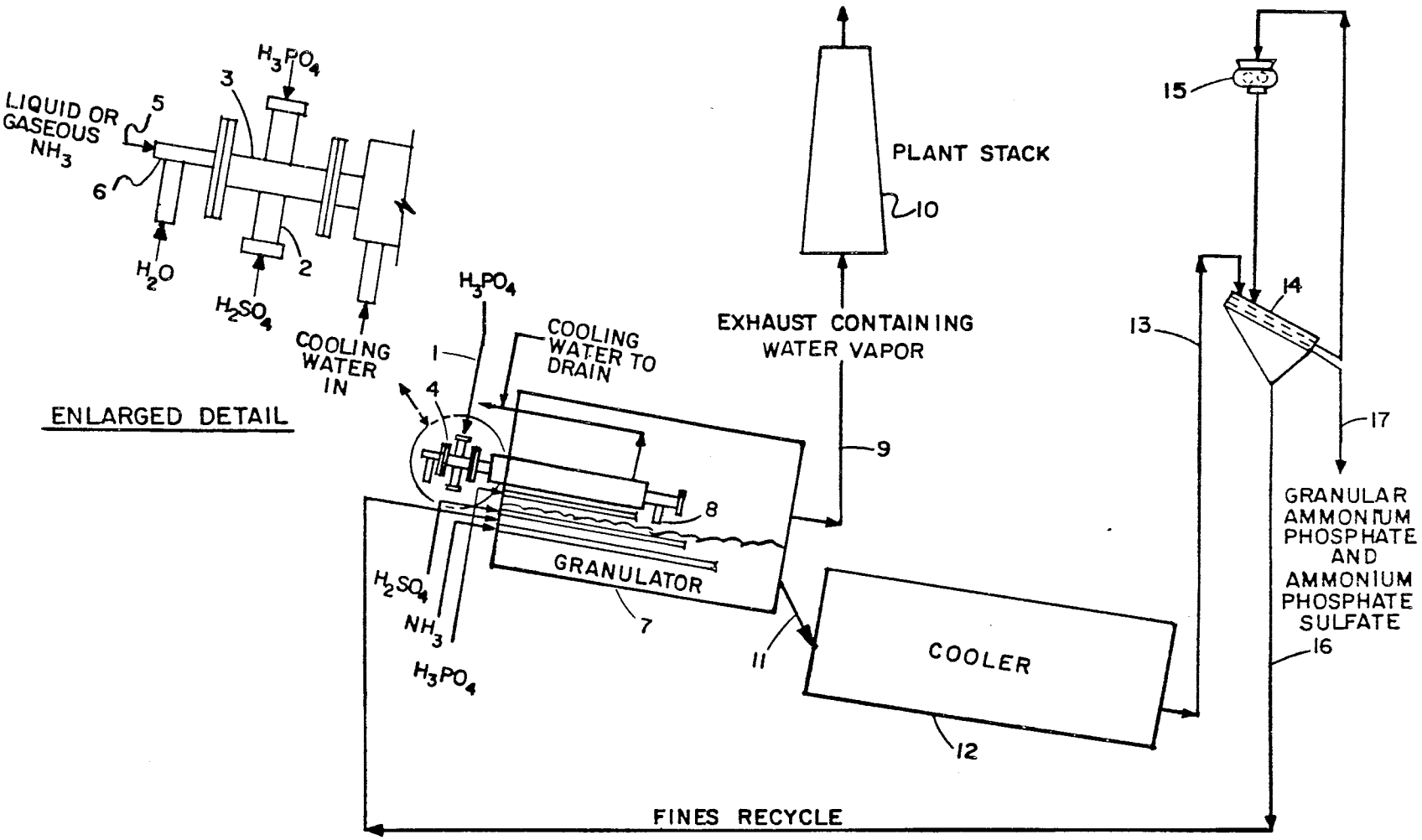
Figure 2:
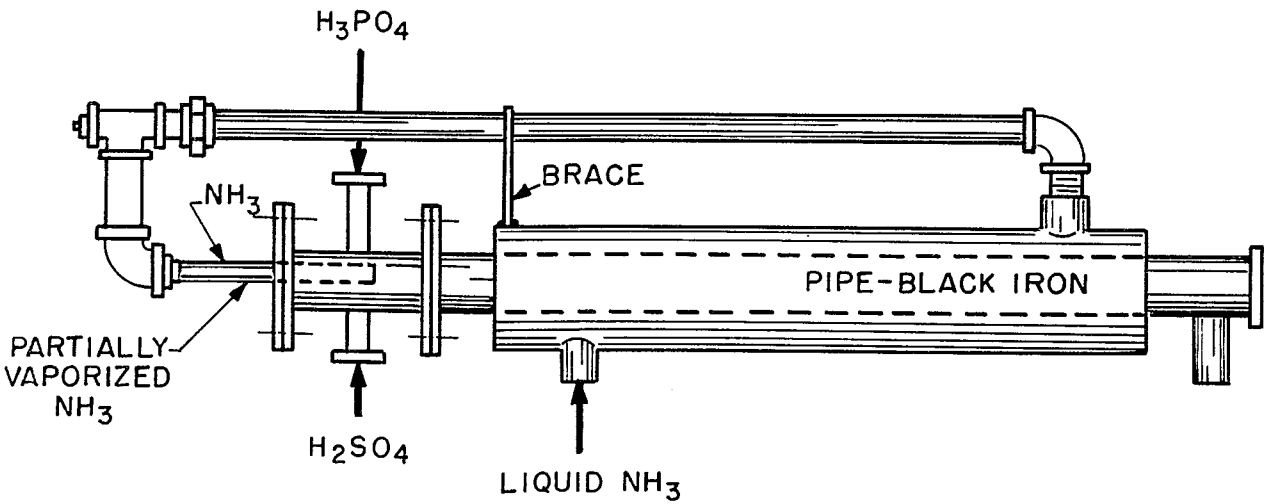
Figure 3:
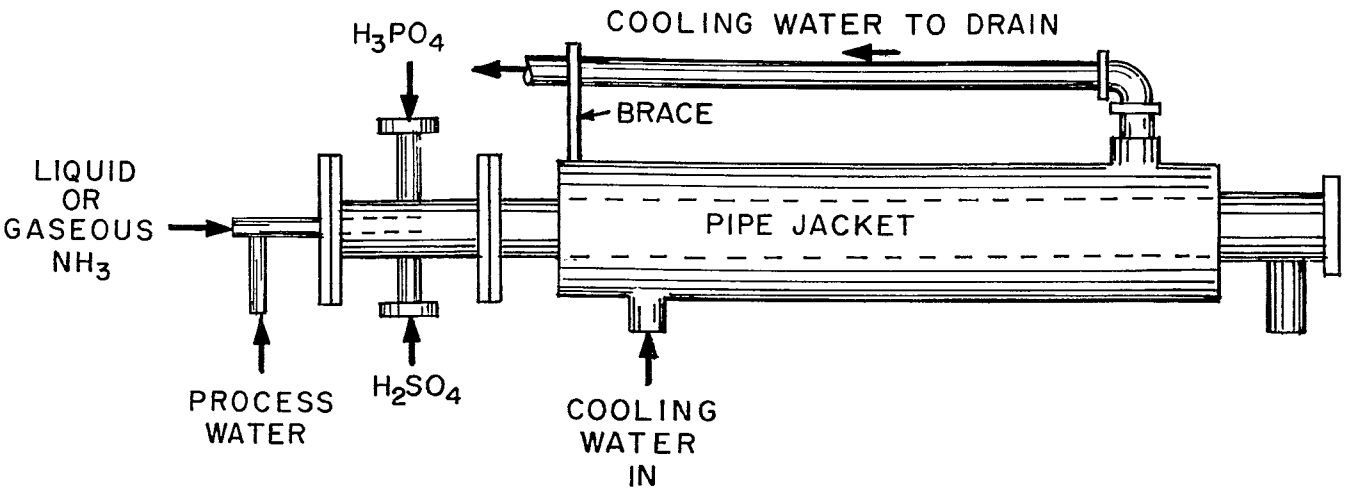

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 190

T942,006

GRANULAR AMMONIUM PHOSPHATE SULFATE USING COMMON PIPE-CROSS-TYPE REACTOR

Frank P. Achorn, 2315 Sherrod Ave., and Josiah S. Lewis, Jr., 153 S. Sequoia, both of Florence, Ala. 35630

Filed Sept. 16, 1974, Ser. No. 506,225
Int. Cl. C01b *13/16, 25/26*
U.S. Cl. 423—310
3 Sheets Drawing. 18 Pages Specification

A process for the production of fertilizers wherein separate streams of phosphoric acid and sulfuric acid are reacted simultaneously with hot concentrated aqua ammonia. The hot aqua ammonia is prepared by reacting anhydrous ammonia with small quantities of water in a common pipe reactor with the resulting mixture being subsequently mixed downstream of said common pipe with said separate streams of acid being introduced through a pipe cross. The resulting reaction occurs in the pipe cross and an extension of the pipe reactor beyond the cross. Overall length of the pipe-cross reactor is about 7 feet and is water jacketed for cooling of the stainless steel to minimize corrosion. The resulting slurry from the pipe cross extension is distributed on a rolling bed of material in a rotary drum granulator, together with additional ammonia and phosphoric acid as desired. Dry potash may be added to the bed as well as recycled, screened product from the process. The process is easy to operate, utilizes uncomplicated and inexpensive equipment, eliminates entirely the need for a preneutralization step and attendant equipment, and produces monoammonium phosphate as well as ammonium phosphate sulfate.

GRANULAR AMMONIUM PHOSPHATE SULFATE USING COMMON PIPE-CROSS-TYPE REACTOR

Original Filed Sept. 16, 1974

PIPE-CROSS REACTOR WITH AMMONIA VAPORIZER

PIPE-CROSS REACTOR WITH HOT AQUA AMMONIA